(12) United States Patent
Loeb (10) Patent No.: US 7,370,048 B2
(45) Date of Patent: May 6, 2008

(54) FILE STORAGE METHOD AND APPARATUS

(75) Inventor: Mitchell L. Loeb, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/140,382

(22) Filed: May 27, 2005

(65) Prior Publication Data

US 2006/0271539 A1 Nov. 30, 2006

(51) Int. Cl.
G06F 7/00 (2006.01)
G06F 17/30 (2006.01)

(52) U.S. Cl. .................. 707/7; 707/1; 341/50; 712/1
(58) Field of Classification Search ............... 382/173; 707/1, 2, 3, 5, 100, 101, 102, 200, 7, 204, 707/4; 711/100, 216, 170; 715/854; 717/128; 725/24; 341/51
See application file for complete search history.

(56) References Cited

U.S. PATENT DOCUMENTS

| | | | | |
|---|---|---|---|---|
| 4,290,105 A | * | 9/1981 | Cichelli et al. ................. 707/5 |
| 5,339,398 A | * | 8/1994 | Shah et al. .................. 711/216 |
| 5,390,173 A | * | 2/1995 | Spinney et al. ............. 370/393 |
| 5,390,359 A | * | 2/1995 | Damerau ......................... 707/3 |
| 5,418,947 A | * | 5/1995 | Hsu et al. ....................... 707/1 |
| 5,526,363 A | | 6/1996 | Weiss et al. |
| 5,809,494 A | * | 9/1998 | Nguyen .......................... 707/1 |
| 5,893,120 A | | 4/1999 | Nemes |
| 5,987,462 A | * | 11/1999 | Kasao et al. .................. 707/10 |
| 6,031,935 A | * | 2/2000 | Kimmel ....................... 382/173 |
| 6,226,629 B1 | * | 5/2001 | Cossock ......................... 707/3 |

(Continued)

FOREIGN PATENT DOCUMENTS

JP 5028290 A 2/1993

OTHER PUBLICATIONS

Jeffrey Scott Vitter, "Implementations for coalesced hashing", Dec. 1982, ACM Press, vol. 25 Issue 12, 911-926.*

(Continued)

Primary Examiner—Christian Chace
Assistant Examiner—Jeffrey C Leng
(74) Attorney, Agent, or Firm—Martin McKinley, Esq.; Steven M. Greenberg, Esq.; Carey Rodriguez Greenberg & Paul LLP (57) ABSTRACT

A method for storing data in a data storage area of a computer that utilizes hashing functions to avoid collision of data records. A first hash function attempts to place a new data record in a home address in the data table. If a data record already exists in that slot, a collision occurs, and a second hash function is applied on each of the new data record and the stored data record to determine a new target slot. Application of each second hash function results in an increment advancement amount for the new data record and an incremental advancement amount for the stored data record. The new data record is stored in the new target slot, where the new target slot is determined based on one or both of the incremental advancement amount for the new data record and the incremental advancement amount for the stored data record.

8 Claims, 7 Drawing Sheets

U.S. PATENT DOCUMENTS

| | | | |
|---|---|---|---|
| 6,442,553 B1* | 8/2002 | Take | 707/100 |
| 6,449,613 B1* | 9/2002 | Egolf et al. | 707/7 |
| 6,567,817 B1 | 5/2003 | VanLeer | |
| 6,625,612 B1* | 9/2003 | Tal et al. | 707/102 |
| 6,725,223 B2* | 4/2004 | Abdo et al. | 707/100 |
| 6,862,602 B2* | 3/2005 | Guha | 707/101 |
| 7,058,639 B1* | 6/2006 | Chatterjee et al. | 707/100 |
| 2003/0018878 A1* | 1/2003 | Dorward et al. | 711/216 |
| 2003/0028547 A1* | 2/2003 | Boa et al. | 707/100 |
| 2004/0220975 A1 | 11/2004 | Carpentier et al. | |
| 2004/0230989 A1* | 11/2004 | Macey et al. | 725/24 |
| 2004/0267745 A1* | 12/2004 | HoogerBrugge et al. | 707/8 |
| 2005/0229254 A1* | 10/2005 | Singh et al. | 726/23 |
| 2005/0251524 A1* | 11/2005 | Shukla | 707/100 |
| 2006/0143168 A1* | 6/2006 | Rossmann | 707/4 |
| 2006/0218176 A1* | 9/2006 | Hsu et al. | 707/102 |
| 2006/0248079 A1* | 11/2006 | Braica | 707/7 |

OTHER PUBLICATIONS

J. Ian Munro and Pedro Celis, "Techniques for collision resolution in hash tables with open addressing", Nov. 1986, IEEE Computer Soceity Press, Proceedings of 1986 ACM Fall joint computer conference ACM '86, 601-610.*

* cited by examiner

| 115 | 105 keys | 95 pseudo-link |
|---|---|---|
| 0 ← KEY 22 | ... | "00" |
| 1 | ... | "00" |
| 2 | ... | "00" |
| 3 | ... | "00" |
| 4 | ... | "00" |
| 5 | ... | "00" |
| 6 | ... | "00" |
| 7 | ... | "00" |
| 8 | ... | "00" |
| 9 | ... | "00" |
| 10 | ... | "00" |

| 115 | 105 keys | 95 pseudo-link |
|---|---|---|
| 0 | 22 | "00" |
| 1 | ... | "00" |
| 2 ← KEY 13 | ... | "00" |
| 3 | ... | "00" |
| 4 | ... | "00" |
| 5 | ... | "00" |
| 6 | ... | "00" |
| 7 | ... | "00" |
| 8 | ... | "00" |
| 9 | ... | "00" |
| 10 | ... | "00" |

| 115 | | 105 keys | 95 pseudo-link |
|---|---|---|---|
| | 0 | 22 | "00" |
| KEY 24 collision | 1 | ... | "00" |
| | 2 | (13) | "00" |
| | 3 | ... | "00" |
| | 4 | ... | "00" |
| | 5 | ... | "00" |
| | 6 | ... | "00" |
| | 7 | ... | "00" |
| | 8 | ... | "00" |
| | 9 | ... | "00" |
| | 10 | ... | "00" |

| 115 | | 105 keys | 95 pseudo-link |
|---|---|---|---|
| | 0 | 22 | "00" |
| KEY 23 | 1 | ... | "00" |
| | 2 | 13 | "01" |
| | 3 | ... | "00" |
| | 4 | 24 | "00" |
| | 5 | ... | "00" |
| | 6 | ... | "00" |
| | 7 | ... | "00" |
| | 8 | ... | "00" |
| | 9 | ... | "00" |
| | 10 | ... | "00" |

FILE STORAGE METHOD AND APPARATUS

BACKGROUND OF THE INVENTION

1. Statement of the Technical Field

The present invention relates to data storage and retrieval systems and more particularly to a method and system for relocating records that hash to the same location in a data table and storing said relocated records in an optimal and efficient manner.

2. Description of the Related Art

Storing records in a data table is a common task. Applications are designed to retrieve banking records, credit records, employee records, student records or any other type of record using various search algorithms. Many common techniques employ search algorithms to search through the data table in order to place records in empty slots or "buckets". Serial search algorithms and hashing algorithms are a few examples.

A serial or linear search algorithm searches through the data table one slot at a time until an available slot is discovered. Thus, starting at the beginning of the table, each slot is examined until an empty slot is found. Of course, this may be very time consuming if the next available slot for a 1,000-location data table is 600 slots away, since 599 slots will have to be checked before an available slot is found.

Hashing is a method that stores data in a data table such that storing, searching, retrieving, and inserting and deleting data can be done much faster than by traditional linear search methods. Hashing is very useful in scenarios where data record keys do not map directly into data table locations. As an example, if 100 student ID numbers all fall within a particular value range, e.g., 0 to 99, it would be simple to map each data record into a corresponding slot in the data table. Student ID Number 1 would be mapped into data slot number 1, etc. Thus, each data record, identified by a "key" value, is mapped directly to a corresponding slot, so retrieving the record at a later date would be immediate. However, if the student ID numbers do not range from 0 to 99, but instead range from 0 through 9999, a different situation is presented. A data table comprised of 10,000 slots could be constructed, but this is wasteful since only a small fraction of the table (one-tenth) would be used to store 100 data records.

In the above example, a hash function can be created to store the 100 records in an array of a much smaller size in order to efficiently store, and later retrieve, each of the records. For example, if the student ID numbers (each ID number is a "key" that identifies each record) were known to be multiples of 100, e.g., 0, 100, 200, . . . 9800, 9900, a hash function could be constructed to store each record in an array comprised of only 100 slots. Therefore, an array called data can store a record with a student ID number "x" at index data [x/100] (where only the quotient is used and not the remainder). Thus, information relating to a student with ID number 600 can be stored in array slot with index number 6, i.e. data [6].

The result above represents the ideal situation where every key, when hashed, produces a unique index. This is known as perfect hashing and is very difficult to achieve unless the database designer has every record before them prior to creating the data table. The common scenario is when two or more records hash to the identical physical location, (i.e., the record's "home address") in the data table. This is known as a "collision". In the above example, a collision would occur if the student ID number is not 400, but is instead 399. The record with student ID number 300 is stored in index number 3 (300/100=3), but so is the record corresponding to student ID number 399 (399/100=3), which has the identical quotient. Two or more records that hash to the identical home address represent what is known as a "chain". A mechanism is needed to relocate records to available slots in the data table and to link pieces of the chain together.

There are a number of hashing functions that attempt to relocate records of a particular chain. However, each has its drawbacks. A method of measuring the effectiveness of these methods is to compare how many probes (a probe is a physical access of a location in the data table) is needed on average in order to retrieve each record once. For example, a chain of three records that are linked in a simple way so that each probe also identifies the exact location of the next record in the chain would require one probe for the first record, two probes for the second record (a "stop" at the first record before going to the second) and three probes for the third record. This provides an average of two probes (6 probes/3 records) to reach each record once.

Another way to compare hashing methods is to examine the amount of extra storage that is required in the table in order to link the chains. As an example of storage for a link field, the table below has seven locations (0-6).

| | | |
|---|---|---|
| 0 | 47 | |
| 1 | 23 | 3 |
| 2 | | |
| 3 | 52 | 0 |
| 4 | | |
| 5 | | |
| 6 | | |

In the table above, three records were inserted in the following order: 23, 52 and 47. All three records are assumed to hash to the same home address of "1". The table shows that to get to record 47, you must first go to location 1, the target home address for record 47, find that it is not a match for record 47 and then follow the link field (indicated by "3") to location 3. This process continues until a matching record is found or a blank for the link is found and a conclusion is made that this search was unsuccessful. In the case illustrated below, the extra storage for the link field is three bits since a link of "6" (i.e. binary digits 110) may have to be stored. For a larger table, many more bits would be needed for the link.

A third method of comparing hashing functions is to examine the ease of insertion of the new records into the data table. A method that relocates records in the chain away from their home addresses will cause those records to occupy positions in the table that can, in turn, be the home locations for other records. This can result in two or more chains being interlinked, which is referred to as "coalescing". Coalescing can cause the number of probes to increase, since a search would not only have to traverse a chain of common "home" records, but also the records of another chain that are interspersed with the first chain. Methods for eliminating coalesced chains require that records which were previously inserted need to be moved every time two chains are about to coalesce.

Double hashing methods utilize two hash functions. The first hash function produces the home address of the record to be inserted into the data table. A typical algorithm used to determine the home address of the record to be inserted is: HOME=key mod P, where P is the number of positions in the data table and must be a prime number. The second hash function is used to create a variable increment, which is used to skip a number of positions in the data table in an attempt to find an empty slot.

One double hashing technique known as the Linear Quotient method can use the following algorithm to determine the variable increment: INC=1+key mod (P−2). If a new key collides with a key already at its home address, an increment is computed using this function applied to the new key that is to be inserted. This results in a "jump" of a number of positions corresponding to the increment as many times as necessary until an opening in the data table is found. The data table is considered to be circular so that once the bottom of the table is reached, the count wraps around to the top of the table. The Linear Quotient method does not require any link fields but does allow chains to coalesce. On the average, this method requires a high number of probes.

Another hashing technique commonly used is the Computed Chaining method. This method can use algorithm INC above, but applied to the key already stored at a location, and uses that increment to jump as many times as necessary to find an empty location in which to place the key. The multiplier of the increment is then stored in the table as a "number of offsets" field. That field normally requires six bits for a table size of approximately 1,000 records. However, this field can be limited to any number of bits by requiring more intermediate probes. Coalesced chains are resolved by moving keys that are in the way of the new key and that are not at their home addresses. However, this requires movement of all the records that followed the moved key in the chain.

Because of the obvious drawbacks of the two aforementioned techniques, it is desirable to have a double hashing data storage system and method that results in the an optimal data record retrieval performance by lowering the number of average probes and employing a much more efficient method of inserting new keys into the data table.

SUMMARY OF THE INVENTION

The present invention addresses the deficiencies of the art with respect to data storage and retrieval systems and provides a novel and non-obvious system and method for relocating records that hash to the same location in a data table and storing said relocated records in an optimal and efficient manner. In this regard, the method provides a data storage mechanism using a first hash function to attempt to place a key representing a data record in a home address and a second hash function to place the key if a collision occurs due to the existence of a stored data record in the home address. Different incremental advancement quantities are calculated based on the result of the application of the second hash function to each of the new data record and the stored data record. The new data record is then placed in the data table depending on the fewest number of incremental advancement quantities needed to locate an unoccupied location in the data table.

According to one aspect, a method of storing data in a data table is provided. The data table includes a plurality of data record storage slots. The method includes application of a first hash function on a new data record, where the first hash function is for placing the new data record in a home slot in the data table. If it is determined that the home slot already contains a stored data record, a second hash function is applied on each of the new data record and the stored data record to determine a new target slot. Application of each second hash function results in an increment advancement amount for the new data record and an incremental advancement amount for the stored data record. The new data record is then stored in the new target slot, the new target slot being determined based on one or both of the incremental advancement amount for the new data record and the incremental advancement amount for the stored data record.

According to another aspect of the invention, a system for storing a plurality of data records in a data table is provided. The data table includes a plurality of data record storage slots. The system includes a computer having a database, a memory unit, and a processor. The database is adapted to store each of the plurality of data records in a corresponding data record storage slot and the memory is adapted for storing one or more hashing algorithms. The processor is adapted for applying the one or more hashing algorithms to the plurality of data records for placement of a new data record in a corresponding data record storage slot. The hashing algorithms include a first hashing algorithm for placing the a data record in a home data record storage slot, and a second hashing algorithm for determining a new target slot for the new data record if the new data record collides with a stored data record. Application of the second hash function results in an increment advancement amount for the new data record and an incremental advancement amount for the stored data record, where the new target slot is determined based on one or both of the incremental advancement amount for the new data record and the incremental advancement amount for the stored data record.

According to yet another aspect, a machine readable storage device having stored thereon a computer program for storing data in a data table is provided, the data table including a plurality of data record storage slots. The computer program includes a set of instructions which when executed by a machine causes the machine to perform a method. The method includes applying a first hash function to a new data record, the first hash function for placing the new data record in a home slot in the data table. If it is determined that the home slot already contains a stored data record, a second hash function is applied to each of the new data record and the stored data record to determine a new target slot. Application of each second hash function results in an increment advancement amount for the new data record and an incremental advancement amount for the stored data record. The new data record is stored in the new target slot, where the new target slot is determined based on one or both of the incremental advancement amount for the new data record and the incremental advancement amount for the stored data record.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE PREFERRED EMBODIMENTS

The present invention advantageously provides a method and system for storing data in a data storage table of a computer that utilizes hashing functions that result in the optimal placement of data records in the data table while minimizing the number of insertion probes and facilitating the placement of keys associated with each data record.

Figure 1:
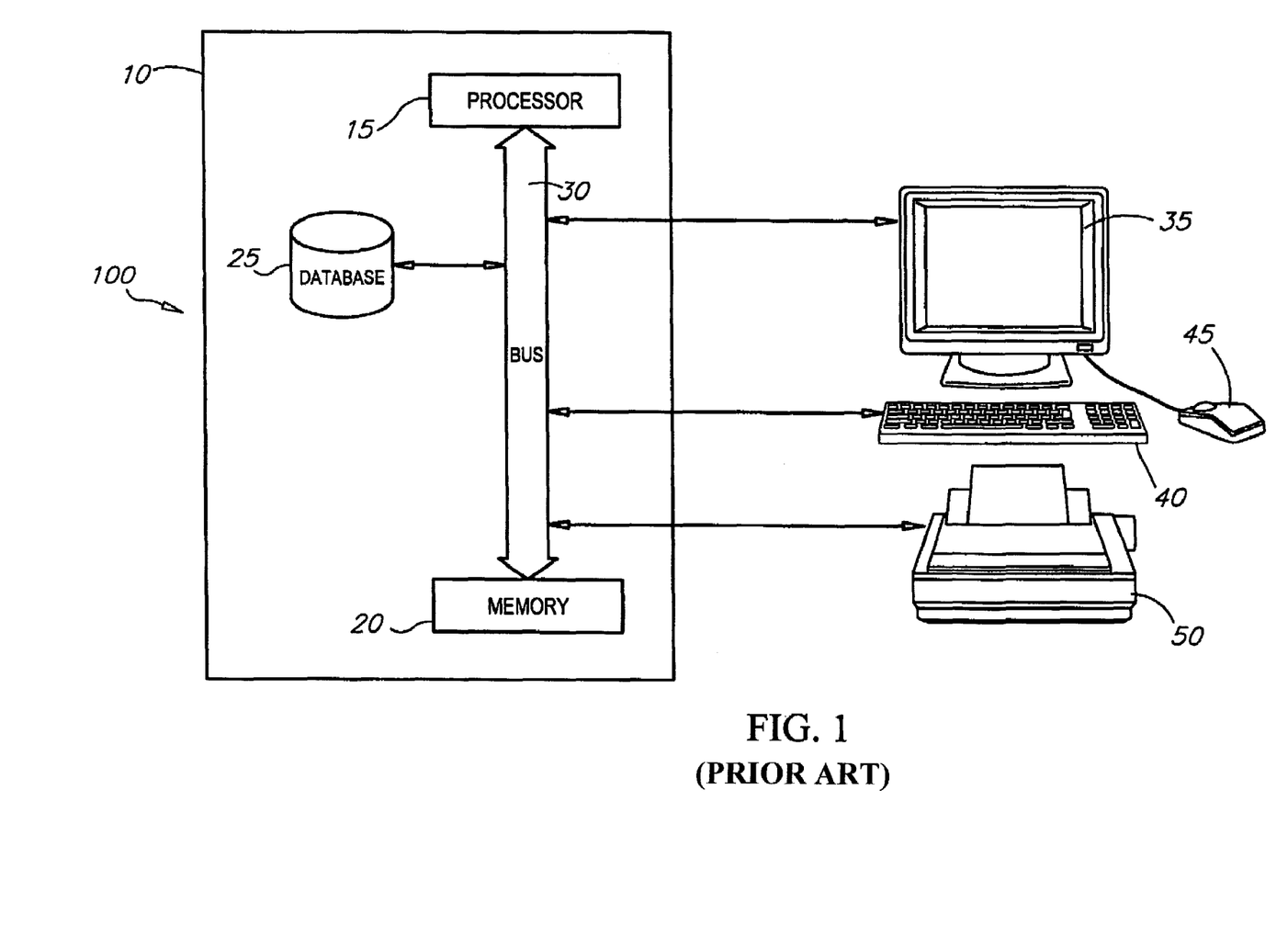
FIG. 1 is a block diagram illustrating a computer database incorporating the present invention.

Referring now to the drawing figures in which like reference designators refer to like elements there is shown in FIG. 1 a system 100 constructed in accordance with the principles of the present invention. System 100 includes a general process computer 10. Computer 10 can be a desktop or laptop computer, a personal digital assistant ("PDA") or the like. Computer 10 includes hardware components as known in the art and as may be required to implement the functions of the present invention described herein. For example, computer 10 may include a central processing unit 15, a memory unit, such as volatile or non-volatile memory 20, a data storage unit 25 and communication bus 30. Input and output devices, such as monitor 35, keyboard 40, mouse, 45 and printer 50 are coupled to bus 30. A remote data storage unit (not shown) may also be incorporated into system. The hardware components are controlled by an operating system and/or one or more application software programs. Computer 10 may also be part of a communication network such as the Internet. The present invention focuses on data storage unit 25 and methods for storing and retrieving data stored therein.

Figure 2:
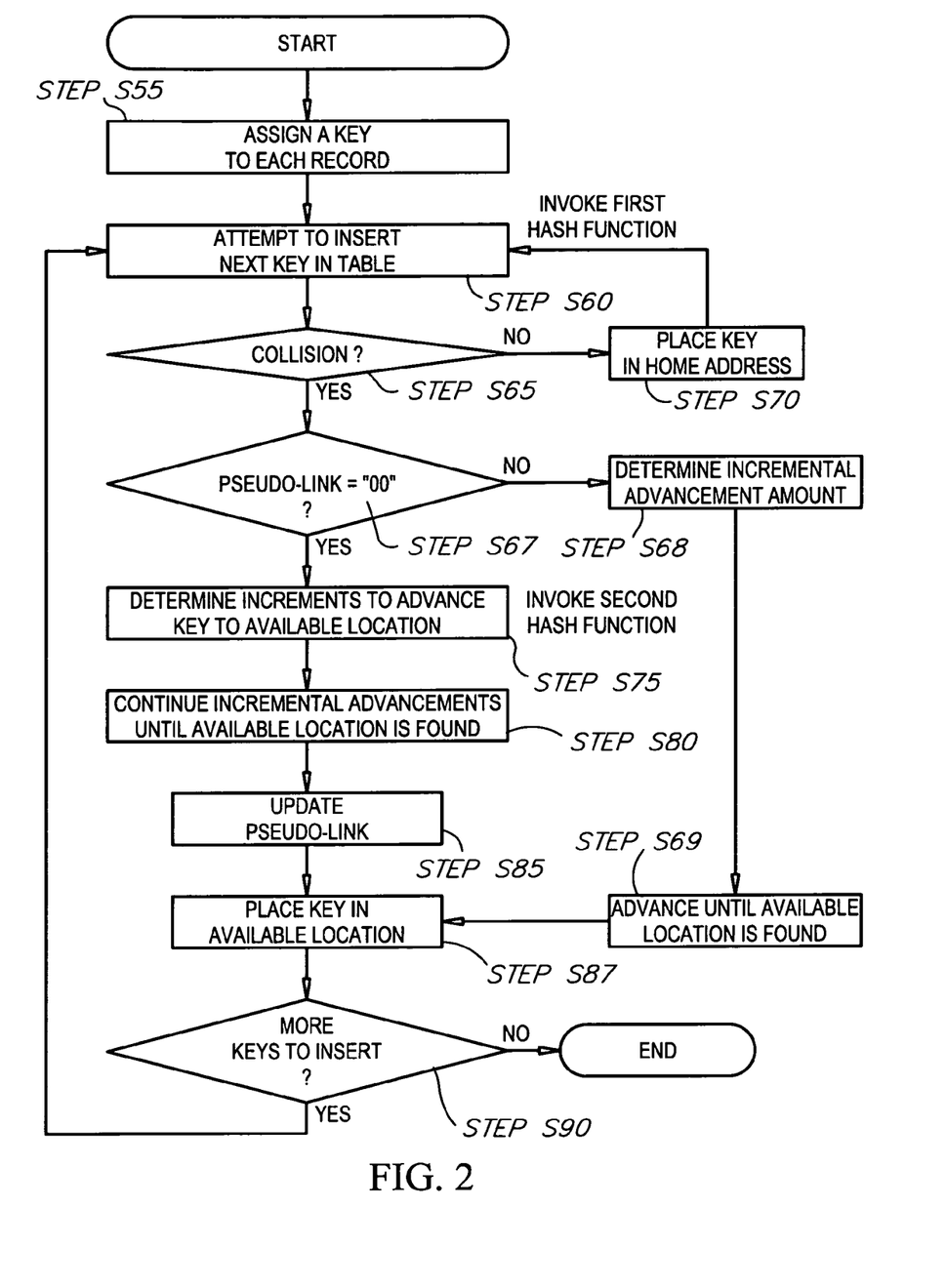
FIG. 2 is a flowchart illustrating the inventive method.

Referring now to FIG. 2, a flowchart illustrating the flow of the steps taken by the present invention can be seen. Each data record is assigned a key, via step S55. The key can be any numerical value provided each data record is associated with a unique key. Data storage unit 25 includes one or more data tables, in which the data records are stored. An attempt is made to insert a key representing an initial data record into a slot in the data table, via step S60. If the slot is not already occupied by a key, the key representing the initial data record is inserted into the slot, via step S70. A first hash function is used to determine where the key is to be placed in the data table. The slot where the key now resides is referred to as that key's "home address". If it is determined that the slot to which the key is directed is already occupied, then a collision has occurred and steps must be taken in order to place the key in an unoccupied slot in the data table. A check of the pseudo-code representing the jump field associated with the data record must first take place.

As will be discussed in greater detail below, the data table includes a multi-bit pseudo-link field associated with each slot. The link represents a code that directs one to the slot where the key that hashed to this home address has been relocated. If the pseudo-code indicates that there are no other data records that hash to the same slot in the data table (i.e., a pseudo-code of "00"), then incremental advancement quantities must be determined via a second hash function, at step S75. It is by these quantities (discussed below in greater detail) that the key is advanced in the hopes that an unoccupied slot in the data table will be found. If more than one slot is available, an incremental advancement quantity is determined by selection criteria. After placement of a key, the link field may have to be updated, via step S85, to reflect the relocation of the incoming key. Referring to this link field at a later time assists in locating and retrieving specific data records. The data record is then stored in the available slot, via step S87.

If, after checking the pseudo-code, it is determined that there are other data records that hash to the same location, an incremental advancement amount based on the value of the pseudo-code is determined, at step S68. The key is advanced by the same increment until an unoccupied slot is found, via step S69. If it is determined that additional data records have to be inserted with the data table via step S90, the process is repeated until all data records have been inserted into the data table.

Figure 3:
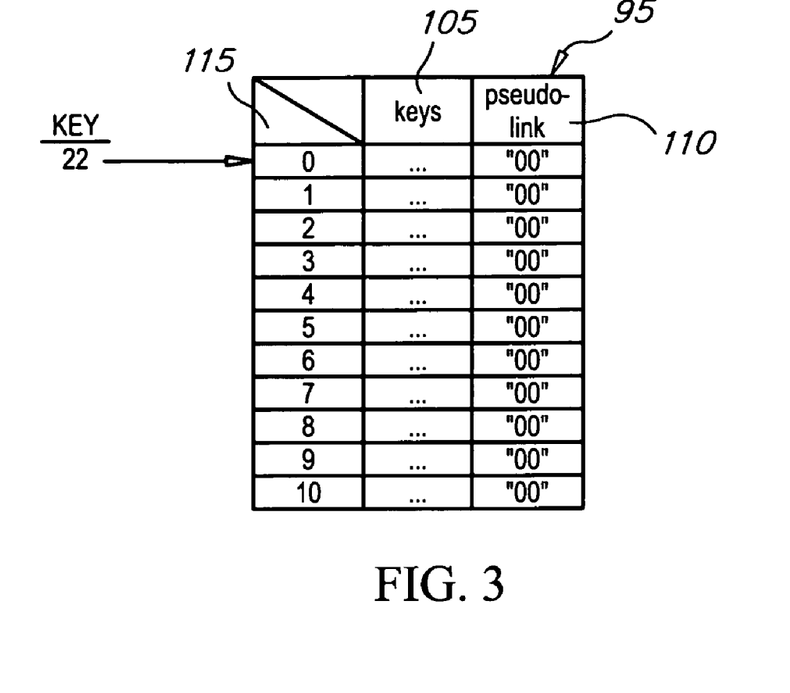
FIG. 3 is a data table in its initialized state.

FIGS. 3 through 12 illustrate the inventive method of the present invention by showing how a series of data records are placed within a data table. The invention provides a hashing function that places keys representing data records in data table slots in an efficient manner. In an exemplary embodiment, a data table 95 is shown in FIG. 3 containing eleven slots. Thus data table 95 may hold eleven separate data records, or keys that represent the data records. The present invention is not limited to the size of the data table or the number of records that are to be placed in the table. Preferably, the size of data table 95, i.e., the number of slots in table 95, is a prime number. In this embodiment, nine data records are to be placed in table 95, which contains 11 available slots.

Data table 95 includes several fields. Slot number field 115 contains slots numbered, in this example, 0 through 10. Each slot has a corresponding key field 105 and pseudo-link field 110. Preferably, pseudo-link field 110 includes a two-bit "jump" link. However, two or more binary digits may be used depending upon the size of the data table. Nine keys, each representing a specific data record, are to be placed in table 95. The keys may be numeric or alphanumeric and may represent any size data record. Preferably, the data records are stored separately from the keys. Use of a pointer can direct a user from a key to its associated data record.

Initially, prior to the insertion of any data records, data table 95 is initialized and has the appearance of the table depicted in FIG. 3. In this example, key number 22, representing a data record, is to be inserted into the data table 95 first. A hash function is used to determine the placement of the key in order to find its "home" address. The present invention may invoke one of a number of different hash functions in order to place the key in its home address. As an example, the hash function: Home Address=key mod table size, is used. Applying this function to the present example, 22 mod 11=0. Thus, data table 95 is checked to determine if any key has already been placed in slot 0. Since this slot is unoccupied, key 22 is placed in this slot resulting in data table 95 as shown in FIG. 4 without the occurrence of a collision.

Figure 4:
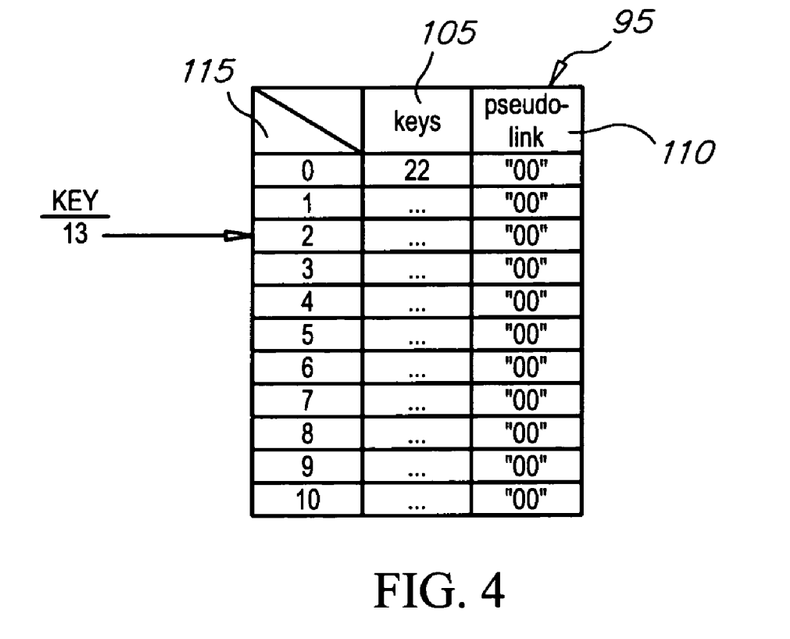
FIG. 4 is the data table after insertion of an initial key utilizing the inventive method.
Figure 5:
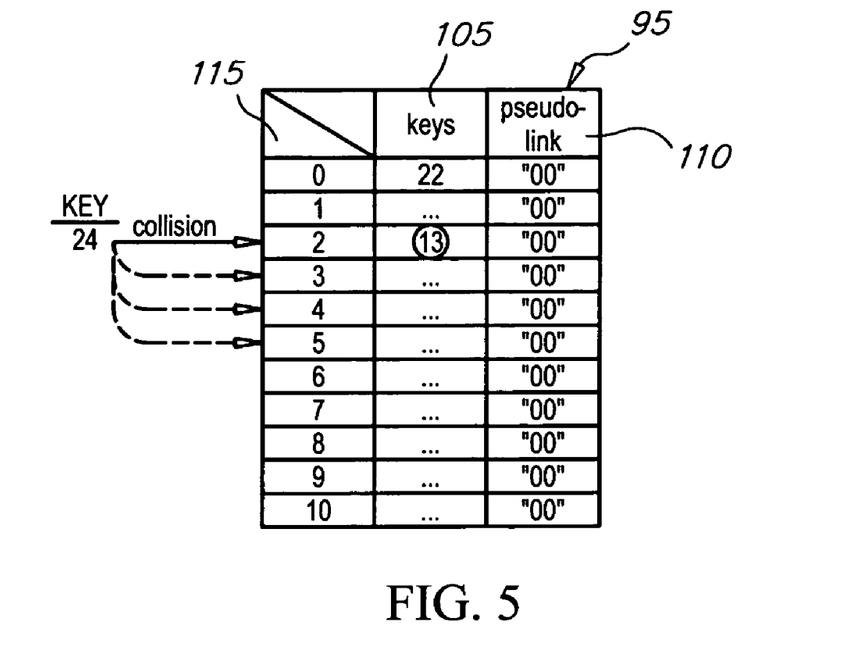
FIG. 5 is the data table illustrating a collision with a stored key and calculated incremental advancement quantities utilizing the inventive method.

Referring to data table 95 in FIG. 4, key 22 has been placed in slot 0. The hash function used to find the home address for key 22 is used for the next key to be placed, key number 13. Utilizing the hash function for the home address results in the following: 13 mod 11=2. Because slot 2 in data table 95 is presently unoccupied, key 13 is placed there and, again, no collision has occurred. After insertion of key 13, data table 95 now appears as shown in FIG. 5.

In the present embodiment, the next key to insert is key number 24, which also has a hash function of 2 (24 mod 11=2), since the hash function being used to determine the key's home address utilizes only the remainder of the integer division, rather than the quotient. The result is a collision since the application of the hash function for key number 13 provides the identical remainder, namely 2. Since key 13 is already located in slot 2, a new location has to be found for key 24. The present invention advantageously incorporates a double hashing mechanism, i.e. a first hash function that determines the key's home address and a second hash function that is an incremental function used to define a "jump" scheme, which when used, enables a limited number of searches or "probes" before an unoccupied slot is located for placement therein of the incoming key.

The pseudo-code or "jump" field 10 is first examined. If the field is represented by the entry "00" and a collision similar to the one described above has occurred, the second, or incremental hash function is invoked. A "00" entry in field 110 is illustrative of one of many different types of link codes that may be used in the present invention. In this example, an entry of "00" means there are presently no other data records in the chain. Of course, this field may need to be updated if other records hash to this slot.

The present invention is not limited to a particular type of first or second hash function. In one exemplary embodiment, the incremental hash function uses a quotient method. In this example, the quotient of the key divided by the size of table 95 is calculated, and the remainder is discarded. Both keys are used, i.e., the key to be inserted into table 95 (key 24), as well as the key which caused the collision and already resides in the desired slot (key 13). The resulting quotient using each key is used as a separate incremental "jump", as is the sum of the resulting quotients. In one embodiment, if the resulting quotient, i.e., the initial "jump" amount, is greater than the size of the table, a new "jump" amount is computed and is equal to the initial "jump" amount mod the size of the data table. Although jump totals that are greater than the table size may still be used as incremental advancement quantities, the above embodiment eliminates the situation where data records are represented by large key numbers and the resulting increments are unduly large. It assures that smaller incremental "jump" amounts are used, leading to quicker and more efficient placement of data records.

Applying the incremental hash function to the present example, the result for key 24 (the key to be inserted) is 2 (24/11 results in a quotient of 2, and a remainder of 2, which is discarded), and the result for key 13 (the key already residing in slot 2) is 1 (13/11 results in a quotient of 1, and remainder of 2, which is disregarded). Thus, the incremental hash function of the present invention results in three "jumps" from slot 2; a jump of 2 (the result of the hash function applied to key 24), a jump of 1 (the result of the hash function applied to key 13) and a jump of 3 (the sum of the individual results of the hash function applied to each key). Therefore, slot 3 (slot 2+an incremental jump of 1), slot 4 (slot 2+an incremental jump of 2), and slot 5 (slot 2+an incremental jump of 3) are checked for availability. It should be noted that if any calculated increment or sum of increments equal zero, the number is preferably changed to an incremental advancement value of 1.

Thus in FIG. 5, an attempt to insert key 24 in slot 2 (indicated by the solid line) results in a collision because of the presence of key 13 in slot 2 (indicated by the circle around key 13). Applying the incremental hash function of the present invention, three alternate slots are checked for availability, slots 3, 4 and 5, indicated by the dotted lines. Because all three alternate slots are unoccupied, and each incremental advance results in only one jump before an unoccupied slot is found, key 24 may be placed in any of slots. The invention may determine placement pf the incoming record by one of any commonly known selection criteria. In one embodiment, when two or more of the calculated increments result in placing the new key in an empty slot, the increment calculated for the incoming record is used first, followed by the increment calculated for the stored key, followed by the increment associated with the sum of each increment. Thus, in this example, key 24, the "incoming" key, is placed in slot 4 and link 110 for slot 2 is updated to reflect the new location of key 24.

Figure 6:
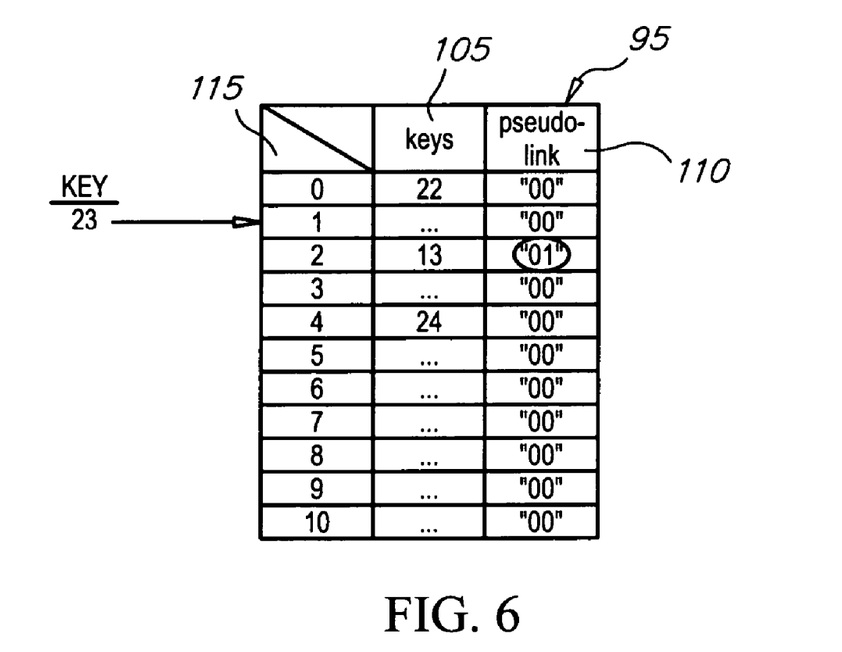
FIG. 6 is the data table illustrating the placement of a key and the updating of the pseudo-link utilizing the inventive method.

However, the invention may use different slot section criteria. In one embodiment, when two or more incremental jumps lead to an available slot, the slot selected for insertion of the incoming key is based on the incremental jump associated with the stored key (i.e., a key in the slot initially determined to be the "home address" of the incoming key). Thus, the invention includes the following slot selection criteria when application of the incremental hash function results in two or more available slots in data table 95:

(a) First: incoming key increment; Second: stored key increment; Third: sum
(b) First: incoming key increment; Second: sum; Third: stored key increment
(c) First: stored key increment; Second: incoming key increment; Third: sum
(d) First: stored key increment; Second: sum; Third: incoming key increment
(e) First: sum; Second: incoming key increment; Third: stored key increment
(f) First: sum; Second: stored key increment; Third: incoming key increment Pseudo-link field 110 is used to assist in locating data records. Referring to FIG. 6, it can be seen that the pseudo-link 110 for slot 2 changed from "00" to "01". The present invention applies binary link codes to table 95 in order to facilitate locating keys that may have been relocated due to collisions. Thus, in one embodiment of the invention, a link field of "00" means that there are no other records in the chain, i.e., there were no collisions for that particular slot. A link field of "01" means that the key relocation increment was calculated using the incremental hash function described above for the key that is trying to be inserted into the slot. Because, key 24 was ultimately placed in slot 4, which is a jump of two from the initial "home address" for key 24 (the key "to be inserted"), and two was the result of the incremental hash function on key 24, pseudo-link 110 for slot 2 becomes "01".

In one embodiment, a link field of "10" means that the key relocation increment was calculated using the incremental hash function described above for the key that already exists in that position. Thus, if key 24 was ultimately placed in slot 3, then link 110 for this slot would have been "10" since slot 3 is a jump of 1 from slot 2, and 1 was the result of the incremental hash function for key 13 (the key that "already exists in that position"). Finally, a link 110 of "11" means that the increment was determined by adding the results of the hash functions as applied to each key. Thus, slot 2 would include a link of "11" if key 24 had been placed in slot 5.

Key number 23 is the next key to be placed in table 95. Because the hash function to determine this key's home address results in unoccupied slot number 2 (23 mod 11=2), key 23 is placed in table 95 without a collision and without the need to invoke the incremental hash function. The resulting data table 95 is shown in FIG. 7.

Figure 7:
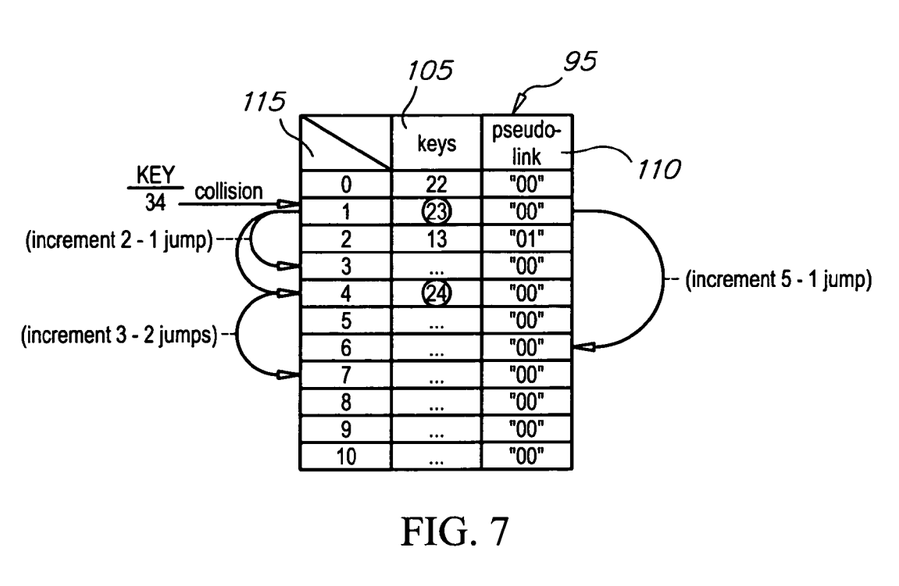
FIG. 7 is the data table illustrating the placement of a key after determining which incremental advancement quantity has the fewest jumps to an unoccupied slot.

FIG. 7 also illustrates the result of trying to insert key number 34 into table 95. Because the home address hash function for key 34 results in placing the key in slot 1 (23 mod 11=1), and slot 1 is already occupied by key 23, a collision results and the incremental hash function of the present invention must be invoked. Applying the algorithms used above for key 24, the calculated increments are 3 (for key 34), 2 (for key 23), and 5 (for the sum of the results for each key). Thus, slot 3 (original home slot 1 plus a jump of 2), slot 4 (original home slot 1 plus a jump of 3) and slot 7 (sum of the jumps for each key) are checked for availability.

Figure 8:
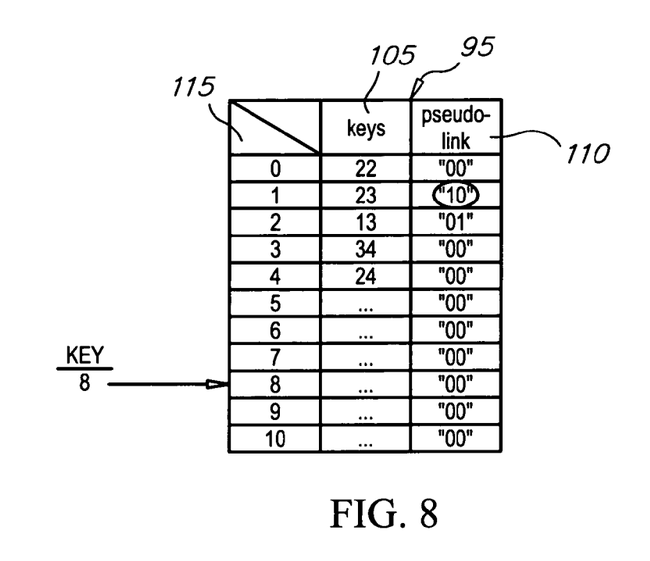
FIG. 8 is the data table illustrating the placement of a key and updating of the pseudo-link.

As can be seen from FIG. 7, a jump of 3 from slot 1 results in an attempted placement of key 3 in slot 4. But key 24 already resides in slot 4 and a collision results. Thus, the increment of 3 is applied again, resulting in an attempted placement in slot 7. Slot 7 is available, however, it took two "jumps" of 3 to get there, as shown in FIG. 7. On the other hand, jumping an increment of 2 or an increment of 5 each result in placement in an unoccupied slot (3 and 6 respectively), via only one jump. Because placement in slot 7 results in an extra jump, this slot is not chosen. We can therefore select either slot 3 or slot 6. In this embodiment, slot 3 is chosen based upon the increment (2) determined for the key already stored at table slot 1 because the increment associated with the incoming key, (3) leads to an occupied slot (slot 4). Thus, key 34 is placed in slot 3, and pseudo-link 110 for slot 1 is updated to "10" as shown in FIG. 8. Of course, any of the above-described selection criteria can be used to determine where an incoming key is to be placed when two or more slots are available. Thus, if the selection criteria being used places an incoming key into a slot associated with the sum of each key corresponding increments (in this case, 5) first, key 34 would be placed in slot 6.

Figure 9:
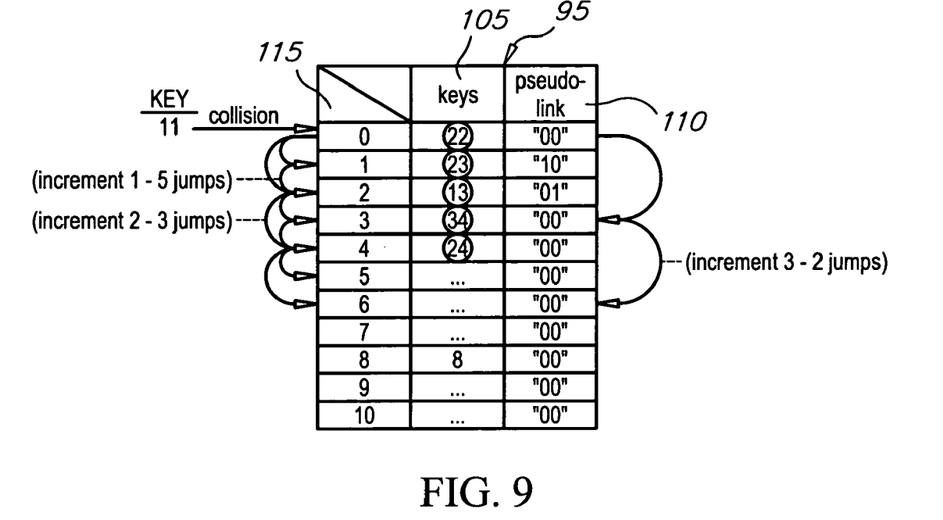
FIG. 9 is the data table illustrating a collision and incremental advancement of the key after determining which incremental advancement quantity has the fewest jumps to an unoccupied slot.
Figure 10:
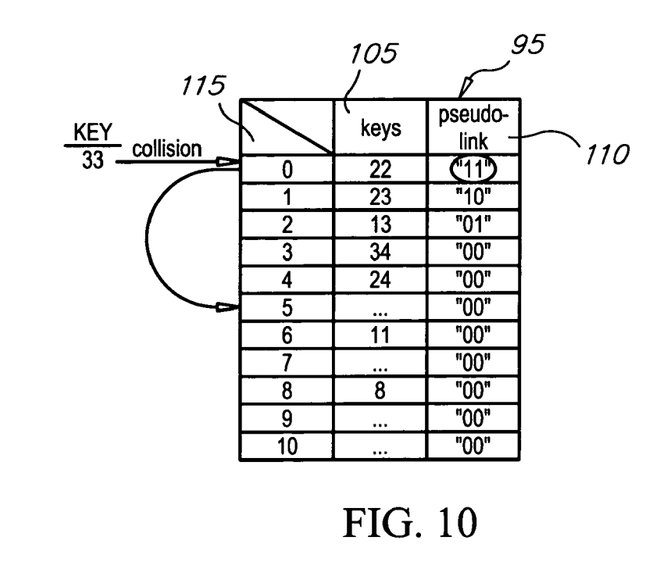
FIG. 10 is the data table illustrating another collision and incremental advancement of the key.

Key 8 is the next key to be inserted in data table 95. As shown by the solid line in FIG. 8 and the table 95 in FIG. 9, key 8 is inserted in slot number 8 without a collision. Again, any suitable hash function to determine a record's home address may be used. Referring to FIG. 9, an attempt is made to insert the next data record, represented by key number 11. Key 11 hashes to a home position of slot 0, which is already occupied by key 22. Using the incremental hash algorithm, the calculated increments are 1 (11/11=1) for key 11, 2 (22/11=2) for key 22, and 3, which is the sum of the two jumps.

In the example of FIG. 9, if an increment of 1 is chosen, the result is a series of five jumps (from slot 0 to slot 5 by increments of one) before an available slot is found. The increment of 2 requires three jumps (starting at slot 0, to slot 2, to slot 4, and to slot 6) before an available slot is found. Finally, using an increment of three results in only two jumps (stating at slot 0, to slot 3, and to slot 6) to again arrive at slot 6. However, the double hash mechanism of the present invention favors the fewest jumps. Thus, the increment of three is used, and pseudo-link 110 at slot 0 is set to "11" using the link definitions defined above, to indicate that the data record for key 11 can be found to be in a slot "x" number of slots away from its intended home address (slot 0), where "x" is the sum of the increments calculated for each key. The result is data table 95 as it appears in FIG. 10.

Figure 11:
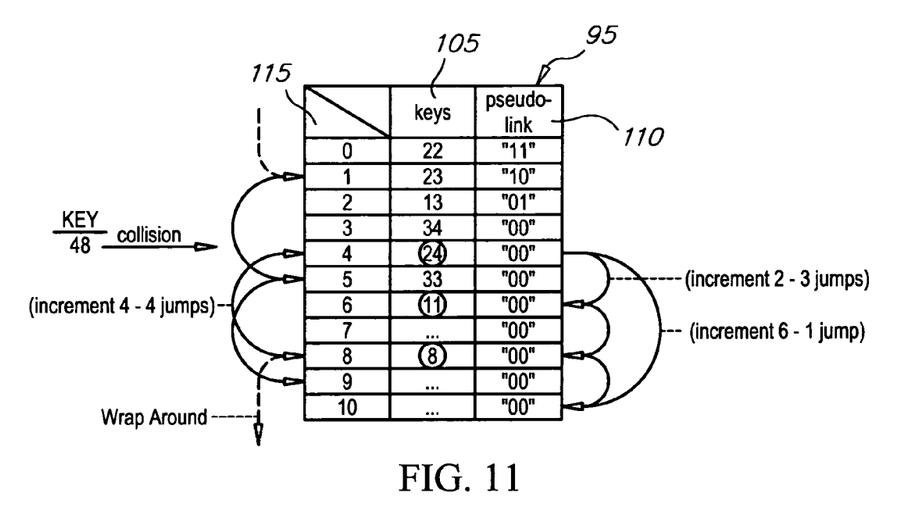
FIG. 11 is the data table illustrating the insertion of the final key utilizing the invention method.

The next key to be inserted, key number 33, also hashes to a home address of 0 (33/11=2 with a remainder of 0). However, the first step in the process is to check the pseudo-link field 110 for that slot. The link field for slot 0 has already been set at "11". Therefore, the sum of the increments for each key must be used. The incremental jump for key 33 is 3 (33/11=3) and the incremental jump for key 22 is 2 (22/11=2). Therefore, key 33 should attempt to be inserted after a jump of five, from slot 0 to slot 5. Slot 5 is open and key 33 is placed there as shown in FIG. 11. If a slot 5 is already occupied by a data record, the inventive process requires that jumps of five should occur until an unoccupied slot is reached. If the end of data table 95 is reached, the jump "wraps around" by proceeding to the top of table 95 and the incremental advancement count continues.

Figure 12:
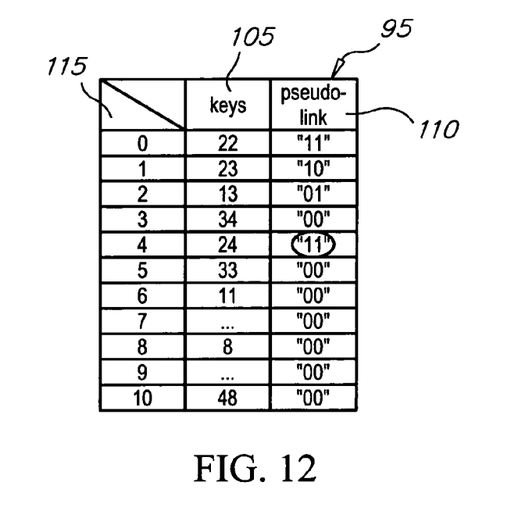
FIG. 12 is the data table after insertion of all data records utilizing the invention method.

The final key, key number 48, hashes to a home address of slot 4, which is already occupied by key 24, thus creating a collision. The increment for incoming key 48 is 4 (48/11=4, with a remainder of 4), the increment for stored key 24 is 2 (24/11=2 with a remainder of 2), and 6 (the sum of each key increment). Beginning in slot 4, using an increment of 4 would require a sequence of four jumps: slot 8 (occupied by key 8), slot 1 (occupied by key 23), slot 5 (occupied by key 33) and slot 9 (unoccupied). Using an increment of 2 would require a sequence of three jumps: slot 6 (occupied by key 11), slot 8 (occupied by key 8), and slot 10 (unoccupied). Using the increment of 6 would require a single jump to unoccupied slot 10. Since the sum of each key increment requires only a single jump, key 48 is placed in slot 10 and the pseudo-code 110 for slot 4 (the intended home address for key 48) is updated to "11" representing the link relating to the sum of the key increments. The data table 95 shown in FIG. 12 represents the final data table after all the data records have been stored and the final link 110 has been updated.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method of storing data in a data table, wherein the data table includes a plurality of data record storage slots, the method comprising:
applying a first hash function on a new data record, the first hash function for placing the new data record in a home slot in the data table;
determining if the home slot already contains a stored data record;
if the home slot already contains a stored data record, applying a second hash function on each of the new data record and the stored data record to determine a new target slot in the data table, wherein applying each said second hash function includes calculating an incremental advancement amount for the new data record and an incremental advancement amount for the stored data record; and
storing the new data record in the new target slot, the new target slot being determined based on one or both of the incremental advancement amount for the new data record and the incremental advancement amount for the stored data record, wherein
storing the new data record in the new target slot comprises:
calculating a first proposed target slot based upon a first incremental advancement amount for the new data record;
calculating a second proposed target slot based upon a second incremental advancement amount for the stored data record;
calculating a third proposed target slot based on a third incremental advancement amount, the third incremental advancement amount being the sum of the first incremental advancement amount and the second incremental advancement amount; and
if two or more of the first proposed target slot, the second proposed target slot and the third proposed target slot are unoccupied slots, selecting the new target slot according to predetermined selection criteria.

2. The method of claim 1, wherein if only one of the first proposed target slot, the second proposed target slot and the third proposed target slot is an unoccupied slot, placing the data record in the unoccupied slot.

3. The method of claim 1, wherein if the first proposed target slot, the second proposed target slot and the third proposed target slot are occupied slots, selecting the new target slot comprises:
using each incremental advancement amount, determining the number of jumps necessary to locate an unoccupied slot; and
selecting the new target slot corresponding to the incremental advancement amount with the fewest number of jumps necessary to locate the unoccupied slot.

4. A method of storing data in a data table, wherein the data table includes a plurality of data record storage slots, the method comprising:
applying a first hash function on a new data record, the first hash function for placing the new data record in a home slot in the data table;
determining if the home slot already contains a stored data record;
if the home slot already contains a stored data record, applying a second hash function on each of the new data record and the stored data record to determine a new target slot in the data table, wherein applying each said second hash function includes calculating an incremental advancement amount for the new data record and an incremental advancement amount for the stored data record; and
storing the new data record in the new target slot, the new target slot being determined based on one or both of the incremental advancement amount for the new data record and the incremental advancement amount for the stored data record,
wherein calculating the incremental advancement amount comprises: applying a numerical key to the data record;
determining the size of the data table, the size of the data table being a prime number equal to the number of total slots in the data table; and
assigning the incremental advancement amount to the data record, the incremental advancement amount equaling a quotient of the numerical key and the table size, and
wherein, if the incremental advancement amount is greater than the table size, calculating a new incremental advancement amount equaling the quotient modulo the table size.

5. A machine readable storage device having stored thereon a computer program for storing data in a data table, the data table includes a plurality of data record storage slots, the computer program comprising a set of instructions which when executed by a machine causes the machine to perform a method including:
applying a first hash function on a new data record, the first hash function for placing the new data record in a home slot in the data table;
determining if the home slot already contains a stored data record;
if the home slot already contains a stored data record, applying a second hash function on each of the new data record and the stored data record to determine a new target slot in the data table, wherein applying each said second hash function includes calculating an incremental advancement amount for the new data record and an incremental advancement amount for the stored data record; and
storing the new data record in the new target slot, the new target slot being determined based on one or both of the incremental advancement amount for the new data record and the incremental advancement amount for the stored data record, wherein
storing the new data record in the new target slot comprises:
calculating a first proposed target slot based upon a first incremental advancement amount for the new data record;
calculating a second proposed target slot based upon a second incremental advancement amount for the stored data record;
calculating a third proposed target slot based on a third incremental advancement amount, the third incremental advancement amount being the sum of the first incremental advancement amount and the second incremental advancement amount; and
if two or more of the first proposed target slot, the second proposed target slot and the third proposed target slot are unoccupied slots, selecting the new target slot according to predetermined selection criteria.

6. The machine readable storage device of claim 5, wherein if only one of the first proposed target slot, the second proposed target slot and the third proposed target slot is an unoccupied slot, placing the data record in the unoccupied slot.

7. The machine readable storage device of claim 5, wherein if the first proposed target slot, the second proposed target slot and the third proposed target slot are occupied slots, selecting the new target slot comprises:

using each incremental advancement amount, determining the number of jumps necessary to locate an unoccupied slot; and selecting the new target slot corresponding to the incremental advancement amount with the fewest number of jumps necessary to locate an unoccupied slot.

8. A machine readable storage device having stored thereon a computer program for storing data in a data table, the data table includes a plurality of data record storage slots, the computer program comprising a set of instructions which when executed by a machine causes the machine to perform a method including:

applying a first hash function on a new data record, the first hash function for placing the new data record in a home slot in the data table;

determining if the home slot already contains a stored data record;

if the home slot already contains a stored data record, applying a second hash function on each of the new data record and the stored data record to determine a new target slot in the data table, wherein applying each said second hash function includes calculating an incremental advancement amount for the new data record and an incremental advancement amount for the stored data record; and storing the new data record in the new target slot, the new target slot being determined based on one or both of the incremental advancement amount for the new data record and the incremental advancement amount for the stored data record, wherein calculating the incremental advancement amount comprises:

applying a numerical key to the data record;

determining the size of the data table, the size of the data table being a prime number equal to the number of total slots in the data table; and assigning the incremental advancement amount to the data record, the incremental advancement amount equaling a quotient of the numerical key and the table size, and wherein, if the incremental advancement amount is greater than the table size, calculating a new incremental advancement amount equaling the quotient modulo the table size.

\* \* \* \* \*